(12) United States Patent
Clifford, Jr. et al.

(10) Patent No.: US 6,806,969 B2
(45) Date of Patent: Oct. 19, 2004

(54) OPTICAL MEASUREMENT FOR MEASURING A SMALL SPACE THROUGH A TRANSPARENT SURFACE

(75) Inventors: George M. Clifford, Jr., Los Altos Hills, CA (US); William Gong, Sunnyvale, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 193 days.

(21) Appl. No.: 10/039,599

(22) Filed: Oct. 19, 2001

(65) Prior Publication Data

US 2003/0076510 A1 Apr. 24, 2003

(51) Int. Cl.[7] ............................ G01B 11/28; G01V 8/00
(52) U.S. Cl. ...................... 356/630; 356/626; 356/632; 250/559.27; 250/559.4
(58) Field of Search ................................ 356/630, 632, 356/635, 626, 625; 250/559.26, 559.24, 559.27, 559.4

(56) References Cited

U.S. PATENT DOCUMENTS

| | | | |
|---|---|---|---|
| 4,070,116 A | * | 1/1978 | Frosch et al. ............... 356/625 |
| 4,814,703 A | * | 3/1989 | Carr et al. ............. 324/207.26 |
| 5,233,291 A | * | 8/1993 | Kouno et al. ................ 324/765 |
| 5,473,432 A | | 12/1995 | Sorin |
| 5,610,716 A | | 3/1997 | Sorin et al. |
| 5,633,712 A | | 5/1997 | Venkatesh et al. |
| 5,642,196 A | | 6/1997 | Alves et al. |
| 5,646,734 A | | 7/1997 | Venkatesh et al. |
| 5,731,876 A | | 3/1998 | Venkatesh et al. |
| 5,850,287 A | | 12/1998 | Sorin et al. |

* cited by examiner

Primary Examiner—Frank G. Font
Assistant Examiner—Roy M. Punnoose

(57) ABSTRACT

The invention provides a system and method for reliably and accurately measuring the gap between two materials when the depth of gap is less than the smallest distance that an optical thickness gauge (OTG) is able to measure. The invention is practiced by forming a suitable slot (or a groove, channel, hole or other suitable deformation) having a precisely known depth in at least one material. The sum of the distance of the gap and the depth of the slot is at least equal to the smallest distance that the OTG can measure. The slot is positioned over the materials and under the OTG probe head such that a cavity is formed. The depth of the cavity is measured. Since the distance of the slot is known, the depth of the gap is determined by subtracting the known depth of the slot from the measured depth of the cavity.

17 Claims, 6 Drawing Sheets

OPTICAL MEASUREMENT FOR MEASURING A SMALL SPACE THROUGH A TRANSPARENT SURFACE

BACKGROUND OF THE INVENTION

The present invention generally relates to optical reflectometry, and more particularly, to a system and method for measuring a gap between two surfaces. With the advent of optical refletometry-based measuring devices capable of distances as small as 10 microns (sm), precise and accurate measurements critically small distances can be made. A nonlimiting example of an optical reflectometry-based measuring device is the optical thickness gauge (OTG) once sold by Hewlett-Packard (HP 86125A-KIX). The operation and functionality of such an OTG is disclosed in of U.S. Pat. No. 5,642,196, filed on Jun. 24, 1997, and entitled METHOD AND APPARATUS FOR MEASURING THE THICKNESS OF A FILM USING LOW COHERENCE REFLECTOMETRY, which is entirely incorporated herein by reference. Other exemplary optical reflectometry-based measuring devices and their applications, incorporated herein by reference, are disclosed in U.S. Pat. No. 5,473,432, filed on Dec. 5, 1995, and entitled APPARATUS FOR MEASURING THE THICKNESS OF A MOVING FILM UTILIZING AN ADJUSTABLE NUMERICAL APERTURE LENS, U.S. Pat. No. 5,610,716, filed on Mar.11, 1997, and entitled METHOD AND APPARATUS FOR MEASURING FILM THICKNESS UTILIZING THE SLOPE OF THE PHASE OF THE FOURIER TRANSFORM OF AN AUTOCORRELATOR SIGNAL, US. Pat. No. 5,633,712, filed on May 27,1997, and entitled METHOD AND APPARATUS FOR DETERMINING THE THICKNESS AND INDEX OF REFRACTION OF A FILM USING LOW COHERENCE REFLECTOMETRY AND A REFERENCE SURFACES, U.S. Pat. No. 5,646,734, filed on Jul. 8, 1997, and entitled METHOD AND APPARATUS FOR INDEPENDENTLY MEASURING THE THICKNESS AND INDEX OF REFRACTION OF FILMS USING LOW COHERENCE REFLECTOMETRY, U.S. Pat. No. 5,731,876, filed on Mar. 24, 1998, and entitled METHOD AND APPARATUS FOR ON-LINE DETERMINATION OF THE THICKNESS OF A MULTILAYER FILM USING A PARTIALLY REFLECTING ROLLER AND LOW COHERENCE REFLECTOMETRY, and U.S. Pat. No. 5,850,287, filed on Dec. 15, 1998, and entitled ROLLER ASSEMBLY HAVING PRE-ALIGNED FOR ON-LINE THICKNESS MEASUREMENTS.

A conventional optical thickness gauge (OTG) is used to measured small distances between surfaces, such as a gap or separation between two materials. However, the OTG is limited in that there is some distance that is the smallest distance that the OTG can measure. That is, distances smaller than the smallest distance that the OTG can measure are less than the TG resolution capability, and therefore can not be determined. For example, one conventional type of OTG has a resolution of 10 microns ($\mu$m). Distances less than 10 $\mu$m can not be determined with a sufficient degree of accuracy and/or reliability.

FIG. 1 is a block diagram illustrating a conventional OTG 100 using a prior art method of measuring distances associated with a multi-layer film 102 and in communication with a personal computer (PC) 104. The OTG 100 has at least a low-coherence light source 106, an optical coupler 108, an autocorrelator 110 and a probe head 112. Low-coherence light 114 is generated by the low-coherence light source 106 and injected into waveguide 116. Waveguide 116 may be any suitable device, such as an optical fiber, that is configured to transfer the low-coherence light 114 to the optical coupler 108. The low coherence light 114 propagates through the optical coupler 108, through the waveguide 118 and into the probe head 112. Light is reflected back into the probe head 112, in a manner described below, through the waveguide 118, through the optical coupler 108, through the waveguide 120. The return light 122 is detected by the autocorrelator 110 so that distance measurements can be determined, as described below, by software (not shown) residing in PC 104.

For convenience of illustration, the waveguide 116 is illustrated as having a separation distance from the low-coherence light source 106. One skilled in the art will appreciate that the waveguide 116 would be typically coupled directly to the low-coherence light source 106 using well known coupling devices. Likewise, the waveguide 120 is illustrated as having some amount of separation from the autocorrelator 110. Waveguide 120 is typically coupled directly to the autocorrelator 110. For convenience of illustration, the waveguide 118 is illustrated as being directly coupled to the optical coupler 108 and probe head 112. Coupling devices used to couple the waveguides 116, 118 and 120 to devices are well known in the art and are not described in detail or illustrated herein. Furthermore, for convenience of illustration, the waveguides 116, 118 and 120 are illustrated as a rod-like material intended to represent a flexible optical fiber. However, any suitable waveguide device configured to transmit light between the low-coherence light source 106, the optical coupler 108, the autocorrelator 110 and the probe head 112, may be substituted for the waveguides 116, 118 and 120.

The optical autocorrelator 110 is configured to receive the return light 122. Detectors (not shown) residing in the autocorrelator 110 generates information such that the autocorrelator 110 generates correlation peaks that are shown on the graph 128. Separation between correlation peaks corresponds to distances between any two light reflecting surfaces.

Optical correlator 110 is coupled to the PC 104 via the connection 124. Information from the autocorrelator 110 is received by the PC 104 and processed by software (not shown) into correlation information. The PC 104 typically displays, on the display screen 126, the correlation results as a graph 128 having correlation peaks, described in greater detail below. That is, distances between correlation peaks correspond to the measurements taken by the OTG 100.

For convenience of illustration, the PC 104 is illustrated as a conventional laptop PC. However, any suitable PC or other processing device may be equally employed for the processing of information corresponding to the light signals received by the autocorrelator 110, and to prepare a meaningful output format that is interpreted by a user of the OTG 100 for the determination of distances. Furthermore, the display 126 may be any suitable device for indicating distance information resulting from measurements taken by the OTG 100. For example, but not limited to, the display 126 may be a conventional, stand-alone cathode ray tube (CRT). Or, a line printer, plotter, or other hard copy device may be configured to accept and indicate correlation information from the autocorrelator 110.

Light (not shown), entering the probe head 112 via the waveguide 118, first passes through a reference surface 130. Here, the reference surface 130 is illustrated as the bottom surface of a wedge-shaped plate 131. (For convenience of illustration, wedge-shaped plate 131 is shown from an edge-on viewpoint.) Reference surface 130 is configured to allow a portion of the received light to pass through the wedge-shaped plate 131 and onto the film 102. A portion of the received light (not shown) entering the wedge-shaped plate 131 is reflected from the reference surface 130, back through the probe head 112, through the waveguide 118, through the optical coupler 108 and then through the waveguide 120 to be received by the autocorrelator 110.

FIG. 2 is a simplified graph 200 illustrating the correlation peaks associated with the reflection of light from the reference surface 130 and the surfaces 132, 134, 136 and 138 of film 102 (FIG. 1) using the prior art method of measuring distances. For convenience of illustrating the autocorrelation information on the graph 200, the vertical axis corresponding to the magnitude of the correlation peaks is not numbered. One skilled in the art will realize that any appropriate vertical axis numbering system corresponding to the amplitude of the correlation peaks could have been employed, and that such a numbering system is not necessary to explain the nature of the correlation peaks. Similarly, the horizontal axis corresponding to distance has not been numbered on the graph 200. One skilled in the art will realize that any appropriate axis number system corresponding to distance could have been employed, and that such a numbering system is not necessary to explain the nature of the relationship between the correlation peaks illustrated in the graph 200. Thus, one embodiment of the software generating the graph 200 is configured to allow the user of the PC 104 to alter the horizontal and the vertical axis numbering systems so that the location of the correlation peaks of interest, and their relative separation corresponding to distance, can be meaningfully discerned and determined by the user of the PC 104 (FIG. 1).

Information received from the autocorrelator 110 is processed by the PC 104 (FIG. 1) such that the correlation peak 202 is plotted at the reference point (x=0) on the graph 200. Correlation peak 202 is a large peak, plotted at the zero or reference point on the x-axis of the graph 200, that corresponds to the correlation of each the reflected light portions with itself.

Returning to FIG. 1, the portion of light passing through the reference surface 130, referred to as the incident beam 140, passes through air for a suitable distance before striking the first surface 132 of film 102. When the incident beam 140 shines upon the surface 132, a portion of the incident beam 140 is reflected from the surface 132, as a reflected light beam 142, back up through the probe head 112, through the waveguide 118, through the optical coupler 108, through the waveguide 120, and then is received by the autocorrelator 110. The autocorrelator 110, based upon the time delay between the light reflected from the reference surface 130 and the reflected light beam 142, determines a correlation peak 204 (FIG. 2) as illustrated on the graph 200. Typically, the magnitude of the reflected light beam 142 is relatively small. Thus, the correlation peak 204 is significantly less in magnitude than the correlation peak 202, as illustrated in the graph 200. The user of the PC 104 viewing the graph 200 interprets the relative separation between the correlation peaks 202 and 204 as corresponding to a distance 144 between the referenced surface 130 and the surface 132 of the film 102.

For convenience of illustration, the incident beam 140 and the reflected light beams 142, 154, 158 and 162 reflected from surfaces 132, 134, 136 and 138, respectively, are shown at slight angles. However, one skilled in the art will appreciate that the incident beam 140 and the light beams 142, 154, 158 and 162 are all orthogonal to the reference surface 130 and the surfaces 132, 134, 136 and 138. Furthermore, for convenience of illustration, because the distance 144 is typically much greater than the distances of interest associated with the film 102, only a portion of the distance between the correlation peaks 202 and 204 is illustrated. Thus, a portion of the horizontal axis and a portion of the distance between the correlation peaks 202 and 204 is omitted from the graph 200, as indicated by the break line 206.

One skilled in the art will appreciate that the separation between the correlation peaks 202 and 204 is function of a variety of well known physical factors. Light travels at a finite speed. The speed of the light is affected by the medium through which the light is traveling. Thus, one skilled in the art will readily appreciate that two significant factors in determining the time delay of the various portions of light detected by the autocorrelator 110 are the total distance traveled by the light, and the properties of the various medium through which the light travels. For example, the reflected light beam 142 travels from the reference surface 130 to the surface 132, and then returns back to the reference surface 130. Therefore, because the reflected light beam 142 travels farther than the light reflecting from the reference surface 130, and because the light beam 142 travels through air, the light beam 142 requires more time to reach the autocorrelator 110 than the time required by the light reflecting from the reference surface 130. The physical properties associated with the mediums through which the light travels is defined by the well known refractive index (n) of the material. Thus, software analyzing the relative separation between the correlation peak 202 and the correlation peak 204 accurately calculates the distance 144 and provides that information to the user of the PC 104. This information is communicated by appropriately labeling the horizontal axis of FIG. 2, and/or providing a numerical figure to the user. Such a process of determining distances with an OTG 100 (FIG. 1) is well known in the art and is not described in further detail herein.

FIG. 1 illustrates the OTG 100 measuring distances associated with film 102. For convenience of illustration, the film 102 has three layers; a top layer 146, a middle layer 148 and a bottom layer 150. The layers 146, 148 and 150 are made from different materials bonded together to create a single layer of film 102. Typically, the film 102 is a long, continuous roll or sheet of flexible material. However, for convenience, only a portion of the roll or sheet of the film 102 is shown in FIG. 1, as illustrated by the cut-away lines 152. Furthermore, the layers 146, 148 and 150 must be sufficiently transparent so the incident beam 140 travels through, and light reflected back through the layers 146, 148 and 150.

Each layer 146, 148 and 150 have different refractive index (n). Surface 132 corresponds to the transition between air and the film 102, and thus corresponds to a change in the refractive index of air to the refractive index of the top layer 146. Similarly, surface 134 corresponds to the transition between the material of top layer 146 and the material of middle layer 148. Surface 136 corresponds to the transition between the middle layer 148 and the bottom layer 150. Surface 138 corresponds to the bottom surface of film 102, and also corresponds to a transition between the bottom layer 150 and the material that the film 102 is residing in, such as air. Each of these surfaces are also characterized by a change in refractive index.

When the incident beam 140 is incident on the surface 134, a portion of the incident beam 140 passes through the surface and a portion of the incident beam 140 is reflected back up to the probe head 112 because of the difference in the refractive index n of the layers 146 and 148. The amount of reflected light corresponds, in part, to the degree of difference between the refractive index n. Thus, when the incident beam 140 passes through the top layer 146 into the middle layer 148, the reflected light beam 154 is reflected from the surface 134 back up through the top layer 146 and into the probe head 112. The reflected light beam 154 is eventually detected by the autocorrelator 110 in the manner described above. Because of the time delay between the reflected light beam 154 from the surface 134 with respect to the light reflected from the reference surface 130, a correlation peak 208 (FIG. 2) will be determined. Furthermore, since the time delay between the reflected light beam 154 from the surface 134, with respect to the reflected light beam 142 from the surface 132, is equal to the time required for the light to travel through the layer 146 only, the separation between correlation peak 204 and correlation peak 208 is proportional to the distance 156 and the index of refraction of the layer 146.

Similarly, a portion of the incident beam 140 incident on the surface 136 corresponding to the material transition between the middle layer 148 and the bottom layer 150, is reflected back up to the probe head 112 as reflected light beam 158. Because of the time delay associated with the reflected light beam 158 with respect to the light reflected from the reference surface 130, a correlation peak 210 (FIG. 2) is determined. Furthermore, since the time delay between the reflected light beam 158 from the surface 136, with respect to the reflected light beam 154 from the surface 134, is equal to the time required for light to travel through the layer 148 only, the separation between the correlation peak 208 and the correlation peak 210 is proportional to the distance 160 in the index of refraction of the layer 148.

Likewise, a portion of the incident beam 140 will be reflected from the surface 138 back up to the probe head 112 as a reflected light beam 162. Because of the time delay associated with the reflected light beam 162 with respect to the light reflected from the reference surface 130, a correlation peak 212 (FIG. 2) is determined. Furthermore, since the time delay between the reflected light beam 162 from the surface 138, with respect to the reflected light beam 158 from the surface 136, is equal to the time required for light to travel through layer 150 only, the separation between the correlation peak 210 and the correlation peak 212 is proportional to the distance 164 and the index of refraction of the layer 150. In some applications, the bottom surface 138 of the film 102 is coated with a highly reflective surface to cause a large portion of the incident beam 140, or all of the remaining incident beam 140, is reflected up to the probe head 112 as the reflected light beam 162. Thus, the correlation peak 212 is illustrated as having a relatively greater magnitude than the correlation peaks 204, 208 and 210 (FIG. 2).

The autocorrelator 110 (FIG. 1) generates a correlation peak for all pairs of reflections from any two surfaces. However, for convenience of illustrating the graph 200 (FIG. 2), not all correlation peaks are illustrated. When spatial separation between the film surfaces 132, 134, 136 and 138 (FIG. 1) are sufficient, correlation peaks generated by the correlation of the reference surface 130 with each of the film surfaces 132, 134, 136 and 138 are used to make measurements of the thickness of the film layers 146, 148 and 150 (FIG. 1). Alternatively, the top surface 132 may be used instead of reference surface 130 to determine correlation peaks.

One skilled in the art will appreciate that many correlation peaks will be displayed on the graph 200, and that one skilled in the art will employ experience in using the OTG 100 (FIG. 1) to determine which correlation peaks are relevant to the particular measurements of interest. Thus, for convenience of illustration, the correlation peaks illustrated on the graph 200 are limited to correlation peaks that are convenient in explaining the operation and functionality of the OTG 100.

Summarizing, the OTG 100 shines a low-coherence incident beam 140 onto the film 102 so that portions of the incident beam 140 are reflected back to the OTG 100 (reflected light beams 142, 154, 158 and 162) and detected by the autocorrelator 110. Software analyzes the time delays associated with the reflected light beams 142, 154, 158 and 162, with respect to the light reflected from reference surface 130, to determine the distances 144, 156, 160 and 164, respectively. The ability to resolve the minimum peak separation is determined by the coherence-length of the light source. Thus, a lower-coherence length light source gives a higher resolution. One commercially available OTG 100 is capable of discerning distances as small as 10 $\mu$m.

However, the above-described commercially available OTG 100 is not capable of measuring with any degree of reliability and accuracy of distances smaller than 10 $\mu$m. Even as technologies advance such that the resolution of more advanced OTGs provide for measuring distances smaller than 10 $\mu$m, there will always be some minimum distance that an OTG is able to measure within an acceptable degree of reliability and accuracy. Distances less that this minimum distance can not be measured with an acceptable degree of reliability and accuracy. Thus, a heretofore unaddressed need exists in the industry for providing a system and method of accurately and reliably measuring distances that are smaller than the minimum distance that an OTG can reliably and accurately measure.

SUMMARY OF THE INVENTION

The present invention reliably and accurately measures a gap between two materials when the depth of the gap is less than the smallest distance that the measuring device, such as an optical thickness gauge (OTG), is able to reliably and accurately measure. For example, if an OTG is capable of measuring distances as small as 10 microns ($\mu$m), the invention allows accurate and reliable measurement of a gap having a distance that is smaller than 10 $\mu$m. The invention is practiced by forming a suitable recess in at least one of the materials. Examples of such a recess include a slot, groove, channel, hole or other suitable deformation. The depth of the recess is precisely known. Thus, the sum of the distance of the gap and the depth of the recess is at least equal to the smallest distance that the OTG can measure with an acceptable degree of reliability and accuracy. The recess may be formed in either material. In an alternative embodiment, the recess is formed in both materials.

The recess is positioned over the materials and under the probe head of the OTG to form a measurable region or cavity. The depth of the cavity is precisely measured. Since the distance of the recess is precisely known, and the depth of the cavity is measurable, the depth of the gap is easily determined by subtracting the known distance of the recess from the measured depth of the cavity. Thus, the inclusion of the recess in at least one of the materials enables the OTG to accurately and reliably determine the depth of the gap. Hereinafter, the term "slot" is used interchangeably with the term "recess" for convenience.

In another embodiment, the depth of the slot is not precisely known when the slot is formed in the material. However, the depth of the slot is at least equal to the distance that the OTG can reliably and accurately measure. Thus, the depth of the slot is determinable by measurement.

The present invention can also be viewed as providing a method for measuring distance between two materials. The method includes the steps of measuring a distance between a slot surface formed by a slot in a first material and a surface on a second material (the first material having a precisely known distance between the slot surface and the surface of the first material); and subtracting from the measured distance the precisely known distance to determine the distance between the first material and the second material.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the present invention. Furthermore, like reference numerals designate corresponding parts throughout the several views.

DETAILED DESCRIPTION

Figure 3:
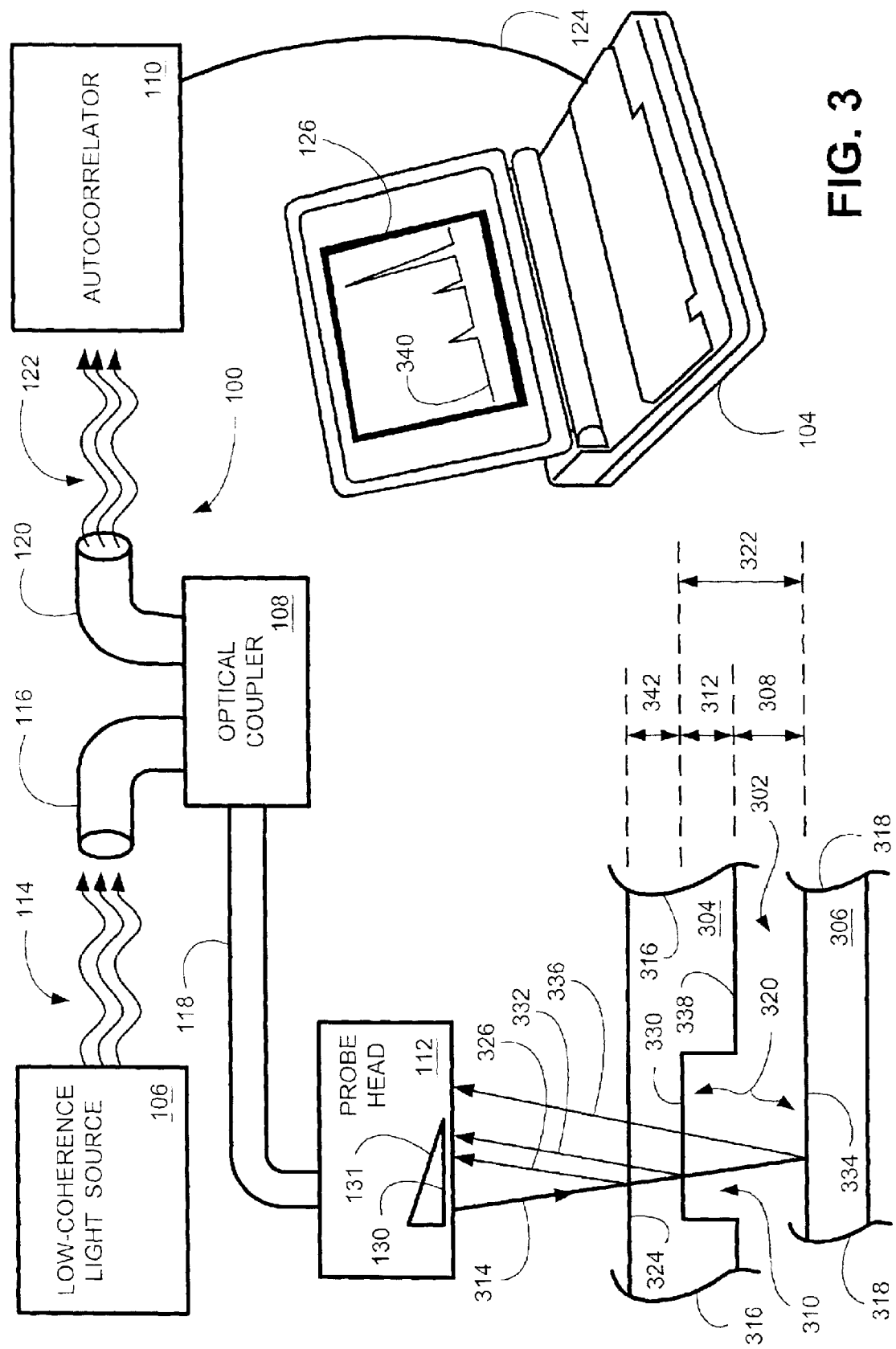
FIG. 3 is a block diagram illustrating the OTG of FIG. 1 measuring a gap between two materials.

FIG. 3 is a block diagram illustrating an optical thickness gauge (OTG) 100 measuring a gap 302 between two materials 304 and 306. The gap 302 has a distance 308 that is less than the smallest resolution distance of the OTG 100. For example, if the OTG 100 is capable of measuring distances as small as 10 microns ($\mu$m), the present invention illustrated in FIG. 3 accurately and reliably measures the gap 302 having a distance 308 that is smaller than 10 $\mu$m.

The operation of the OTG 100 is described above. Therefore, the operation and functionality of the OTG 100 is not described again in detail other than to the extent necessary to understand how the distance 308 of the gap 302 is reliably and accurately determined.

The present invention is practiced by disposing a recess, hereinafter referred to as slot 310, in the material 304. Slot 310 has a depth in which the distance 312 is precisely known. For example, the depth of the slot 310 may be determined by measurement using the OTG 100, by a higher resolution OTG, or by other conventional devices capable of measuring small distances directly or indirectly. Slot 310 is disposed into the material 304 in any suitable manner so long as the depth of the slot 310, (distance 312) is precisely known. Slot 310 forms a surface 330 in material 304. Surface 330 is substantially uniform or flat and does not have any significant surface irregularities or distortions. For example, but not limited to, the slot 310 may be carved, cut or etched into the material 304. In another embodiment, the slot 310 may be included as part of a mold used during the fabrication of the material 304. Slot 310 may be fabricated into the material 304 using any suitable method and/or means to form a precisely known depth (distance 312) of the slot 310. All such methods and/or means for fabricating the slot 310 in the material 304 and for measuring the depth of the slot 310 are intended to be included herein within the scope of this disclosure.

Material 304 is substantially transparent. Thus, the incident beam 314 travels through the material 304. For convenience of illustration, only a portion of the material 304 is shown, as indicated by the cut-away lines 316. Below the material 304 is a material 306. For convenience of illustration, only a portion of the material 306 is shown, as indicated by the cut-away lines 318.

The material 304 and the material 306 are separated by a gap 302. The distance 308 corresponds to the depth of the gap 302. In situations where the distance 308 is smaller than the minimum distance that the OTG 100 is capable of measuring, the slot 310 is positioned over the material 306 and under the probe head 112 to form a measurable region (cavity 320). The cavity 320 is associated with the distance 322. The distance 322 is at least equal to the minimum distance that the OTG 100 is capable of measuring. The distance 322 corresponds to the sum of the distances 308 and 312. Since the distance 312 is precisely known, and the distance 322 is measurable, the distance 308 is easily determined by subtracting the known distance 312 from the measured distance 322. Thus, the inclusion of the slot 310 in the material 304 enables the OTG 100 to accurately and reliably measure the distance 308 of the gap 302.

Figure 4:
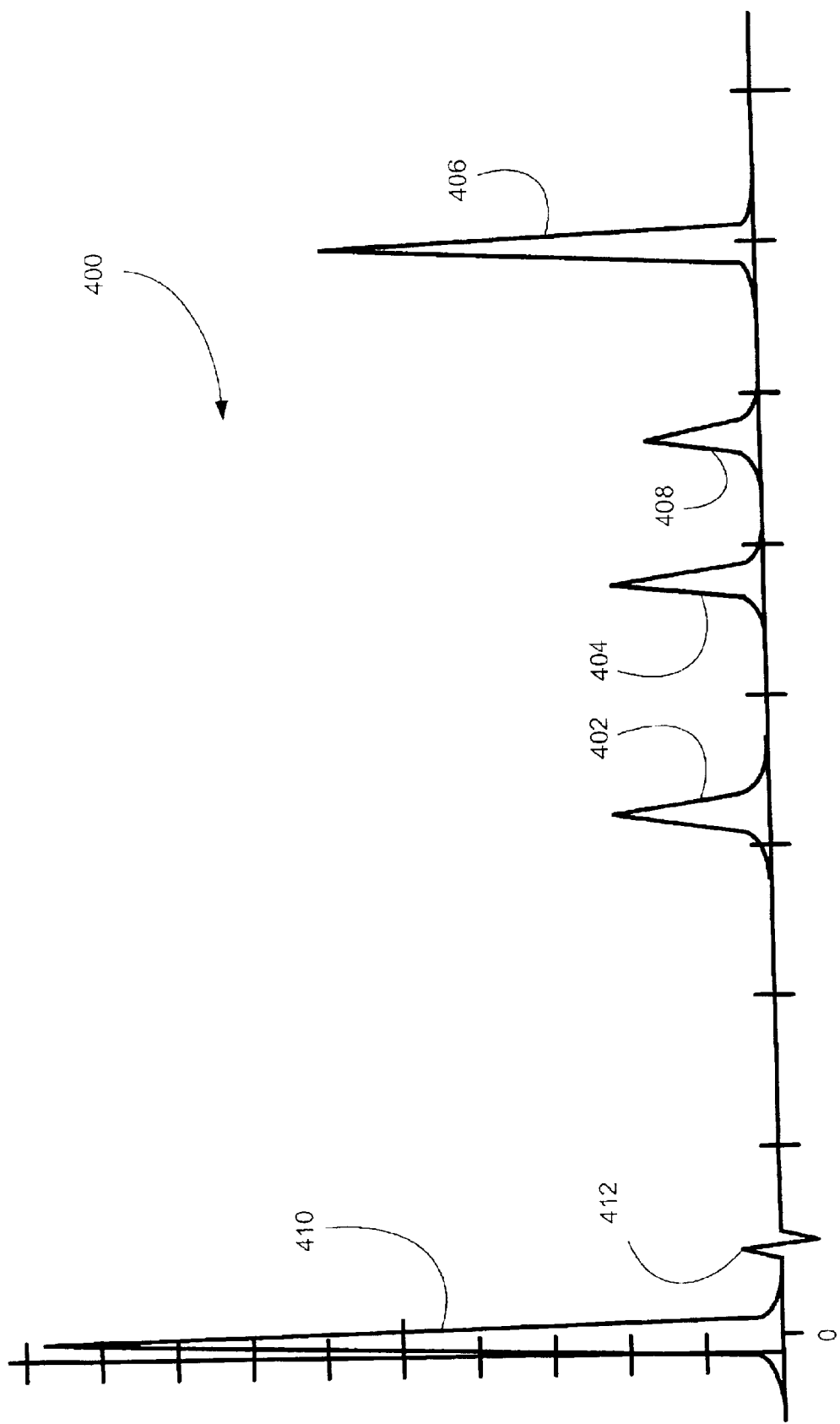
FIG. 4 is a simplified graph illustrating the correlation peaks associated with the reflection of light from the surfaces of the materials of FIG. 3.

When an incident beam 314 is incident upon the top surface 324 of the material 304 a portion of the incident beam 314 is reflected from surface 324. Thus, a light beam 326 is reflected back up into the probe head 112. The reflected light beam 326 is detected by the autocorrelator 110. The difference in the time delay of the reflected beam 326, relative to the time delay of a light beam (not shown) reflected from the reference surface 130 results in a correlation peak 402 (FIG. 4) that is displayed on the graph 400 (FIG. 4).

The unreflected portion of the incident beam 314 travels through the transparent, or partially transparent, material 304 and is incident upon the top surface 330 of the slot 310 such that a reflected light beam 332 is reflected back up through the transparent material 304 into the probe head 112. The reflected light beam 332 is detected by the autocorrelator 110. The difference in the time delay of the reflected light beam 332, relative to the time delay of the reflected light beam (not shown) from reference surface 130 results in a correlation peak 404 (FIG. 4) that is displayed on the graph 400 (FIG. 4).

The unreflected portion of the incident beam 314 continues traveling through the transparent material 304, through the cavity 320, and is incident upon the top surface 334 of the material 306. A light beam 336 is reflected off of the surface 334 up through the gap 302, up through the cavity 320, up through the transparent material 304, and then back up into the probe head 112. The reflected light beam 336 is detected by the autocorrelator 110. The difference in the time delay of the reflected light beam 336, relative to the time delay of the reflected light beam (not shown) from reference surface 130, results in a correlation peak 406 (FIG. 4) displayed on the graph 400 (FIG. 4).

Depending upon the width of the slot 310, the spot size of the incident beam 314, and the positioning of the probe head 112 over the slot 310, a portion of the incident beam 314 may be incident on the bottom surface 338 of the material 304. If so, then a portion of the incident beam 314 will be reflected back up into the probe head 112 as reflected light (not shown for convenience of illustration since this reflected light is not material to determining the distance 308 of gap 302 in this embodiment). This reflected light from the surface 338 will be detected by the autocorrelator 110. Thus, a correlation peak 408 is displayed on the graph 400 (FIG. 4).

If the material 306 is opaque, or if the material 306 includes a highly reflective surface coating (not shown) on the surface 334, then the incident beam 314 will not pass into the material 306. In such a case, there will not be reflections of light from other surfaces back into the probe head 112. In such a situation, the correlation peak 406 is typically much higher than the correlation peaks 402 and 406 because the reflected light beam 336 is stronger (greater strength) than the reflected light beams 326 and 332.

Alternatively, if the material 306 is transparent, or partially transparent, there will be other reflections of light (not shown) back into the probe head 112. However, such other reflections are not necessarily relevant to the operation of the OTG 100 in determining the distance 308 of the gap 302, and therefore, are not discussed again herein, nor illustrated in the several figures. In such a situation, any resultant correlation peaks (not shown) are expected to be discernable from the correlation peaks 402, 404 and/or 406 illustrated on the graph 400.

For convenience of illustrating light reflected from the surfaces 324, 330 and 334, the incident beam 314 and reflected light beams 326, 332 and 336 are shown at slight angles. However, one skilled in the art will appreciate that the incident beam 314 and the reflected light beams 326, 332 and 336 are all orthogonal to the surfaces 324, 330 and 334.

For convenience of illustrating graph 400 (FIG. 4), not all correlation peaks are illustrated. Autocorrelator 110 (FIG. 3) generates a correlation peak for all pairs of reflections from with any two surfaces. For example, autocorrelator would determine a correlation peak associated with the reflected light beam 326 and the reflected light beam 332 (FIG. 3). Another example includes a correlation peak associated with the reflected light beam 332 and the reflected light beam 336 (FIG. 3). Furthermore, additional correlation peaks may be caused by multiple reflections of light beams between the various surfaces of materials 304 and 306. One skilled in the art will appreciate that many correlation peaks will be displayed on the graph 400, and that one skilled in the art will employ experience in using the OTG 100 (FIG. 3) to determine which correlation peaks are relevant to the determination of distance 308. Thus, for convenience of illustration, the correlation peaks illustrated on the graph 400 have been limited to correlation peaks that are necessary for explaining the operation and functionality of the OTG 100 when measuring the distance 322.

Summarizing, the OTG 100 shines the incident beam 314 onto the materials 304 and 306. Portions of the incident beam 314 are reflected back to the OTG 100 (reflected light beams 326, 332 and 336) and are detected by the autocorrelator 110. Software analyzes the path length difference associated with the reflected light beams 326, 332 and 336, with respect to the light reflected from reference surface 130. A person using OTG 100 views the correlation peaks shown on the graph 340 displayed on the display 126 residing on the PC 104.

FIG. 4 is a simplified graph 400 illustrating the correlation peaks associated with the reflection of light from the surfaces of materials 304 and 306, as described in detail below. For convenience of illustrating the autocorrelation information on the graph 400, the vertical axis corresponding to the magnitude of the correlation peaks is not numbered. One skilled in the art will realize that any appropriate vertical axis numbering system corresponding to the amplitude of the correlation peaks could have been employed, and that such a numbering system is not necessary to explain the nature of the correlation peaks. Similarly, the horizontal axis corresponding to distance has not been numbered on the graph 400. One skilled in the art will realize that any appropriate axis number system corresponding to distance could have been employed, and that such a numbering system is not necessary to explain the nature of the relationship between the correlation peaks illustrated in the graph 400. Thus, one embodiment of the software generating the graph 400 is configured to allow the user of the personal computer (PC) 104 (FIG. 3) to alter the horizontal and the vertical axis numbering systems so that the location of the correlation peaks of interest, and their relative separation corresponding to distance, can be meaningfully discerned and determined by the user of the PC 104 (FIG. 3).

Graph 400 illustrates the correlation peaks associated with reflected light beams 326, 332 and 336 detected by autocorrelator 110 (FIG. 3). Information corresponding to the reflected light beams 326, 332 and 336 (FIG. 3) is received from the autocorrelator 110 is processed by the PC 104 (FIG. 3). Thus, a plurality of correlation peaks are plotted on the graph 400. Correlation peak 410 is a large peak, plotted at the zero or reference point on the x-axis of the graph 400, that corresponds to the correlation of each the reflected light beams with itself. For convenience of illustration, because the distance from the reference surface 130 residing in the probe head 112 is typically much greater than the distances of interest associated with the materials 304 and 306, only a portion of the distance between the correlation peaks 410 and 402 is illustrated. Thus, a portion of the horizontal axis and a portion of the distance between the correlation peaks 410 and 402 is omitted from the graph 400, as indicated by the break line 412.

The distances of interest shown in FIG. 3 are readily determined from the position of the correlation peaks 402, 404 and 406 (FIG. 4). The separation between the correlation peak 404 and the correlation peak 406 corresponds to the distance 322 (which also equals the sum of distances 312 and 308). Thus, the distance 322 is determined directly by measurement. The distance 308 of the gap 302 (FIG. 3) is easily determined by simply subtracting the known distance 312 from the measured distance 322. Thus, forming the slot 310 in material 304 allows for direct measurement of the distance 322, and the calculation of the distance 308, with a high degree of accuracy and reliability.

Other distances may be also determined from the position of correlation peaks illustrated in FIG. 4. For example, the separation between the correlation peak 402 and the correlation peak 404 corresponds to the distance 342 (FIG. 3). However, such information is not necessary to determine the distance 308 of the gap 302.

As described above and illustrated in FIG. 3, the slot 310 is formed in the material 304 such that the distance 312 is precisely known. When the slot 310 is positioned between the probe head 112 and the material 306, a cavity 320 is formed. Therefore, the distance 322 is accurately and reliably measured. In various manufacturing and assembly applications, it is desirable to orient two materials relative to each other such that a very precise gap between portions of the two materials is established and/or maintained. For example, during the fabrication of electrical micro-circuits on substrates, two materials may be oriented with respect to each other having a gap with a specified tolerance between the two substrates.

Such critical distances that are otherwise difficult or impossible to measure with a specified degree of reliability and accuracy with a conventional OTG can be measured by incorporating the above described slot, or the slots of the various alternative embodiments described herein. If the top substrate is not transparent, a small area of the substrate is specially fabricated with a transparent material, and a slot formed thereon, such that the measurements described herein are made.

The measurements taken as described herein can be used to initially position portions of two materials relative to each other to create a specified gap distance. Also, measurements taken as described herein can be used to reposition materials to maintain a specified gap distance and/or a gap distance that is less than or equal to a specified tolerance. Here, the determined gap distance is compared with the specified tolerance. At least one of the materials is repositioned to decrease the error distance. Furthermore, measurements taken as described herein can be used for quality control of fabricated units having a gap distance. One skilled on the art will appreciate that there are unlimited uses of the measurements taken as described herein. The above described exemplary uses of the measurements taken as described herein are illustrative of some of the possible applications in which small distance measurements must be taken to measure the gap distance between portions of two materials. Therefore, any such application wherein the gap distance between portions of two materials is measured using the measurement method and system as described herein is intended to be disclosed herein and be protected by the accompanying claims.

As described above and illustrated in FIG. 3, the slot 310 is formed in the material 304 to precisely determine the distance 312. When the slot 310 is positioned between the probe head 112 and the material 306, a cavity 320 is formed. Thus, the distance 322 is accurately and reliably measured. However, the above described embodiment requires that the slot 310 be formed into the material 304. In some situations, it is desirable that the structural integrity of the material 304 not be negatively impacted. Sufficient material must remain between the surfaces 324 and 330 to maintain the structural integrity of the material 304. That is, the remaining material must be thick enough, as indicated by the distance 342, for sufficient structural strength to the material 304. In such a situation where the formation of the slot 310 negatively impacts the structural integrity of the material 304, other alternative embodiments, described below, are desirable to form a measurable cavity.

Furthermore, the separation of the correlation peaks 404 and 402 should be sufficiently great so that the user of the OTG 100 is able to accurately and reliably discern the position of the correlation peak 404 since the separation of the correlation peaks 404 and 402 corresponds to the distance 342 between surfaces 324 and 330 (FIG. 3). That is, if the distance 342 is too small, correlation peak 402 may overlap, partially or entirely, the correlation peak 404 such that the position of correlation peak 404 is not readily discernable. In such a situation, the distance 322 of the cavity 320 might not be accurately or reliably measured.

An alternative embodiment of the invention employs a hole disposed part way through one of the measured materials and having a suitable diameter. Thus, the amount of removed material necessary to create a suitable measurable cavity is minimized. By minimizing the amount of removed material, an embodiment employing a hole minimizes the negative impact to the structural integrity of the material by minimizing the amount of removed material and/or by minimizing the size of the structurally weakened surface area. This embodiment requires that the diameter of the hole be sufficiently large for the transmission of the incident beam and the reflected beams, so that the reflected beams are detectable with a sufficient degree of reliability and accuracy. For convenience of disclosing the invention, any suitable hole used to form a measurable cavity is defined as a slot.

Another embodiment of the invention employs a suitable recess, such as a groove, channel, slot or other suitable elongated deformation having a limited length. By limiting the length of the groove, channel, slot or other suitable elongated deformation, the negative impact to the structural integrity of the material is mitigated by minimizing the amount of removed material and/or by minimizing the size of the structurally weakened surface area. This embodiment requires that the length of the groove, channel, slot or other suitable elongated deformation be sufficiently long enough for the transmission of the incident beam and the reflected beams. Thus, the reflected beams are detectable with a sufficient degree of reliability and accuracy. For convenience of disclosing the invention, any suitable groove, channel, slot or other suitable elongated deformation having a limited length used to form a measurable cavity is defined as a slot.

Other embodiments of the invention employ any suitable deformation in the measured materials so that a measurable cavity is formed. Such a deformation may be formed in any suitable shape and dimension so long as a suitable cavity is formed in the material. For convenience of disclosing the invention, any suitable deformation used to form a measurable cavity is defined as a slot.

Figure 5:
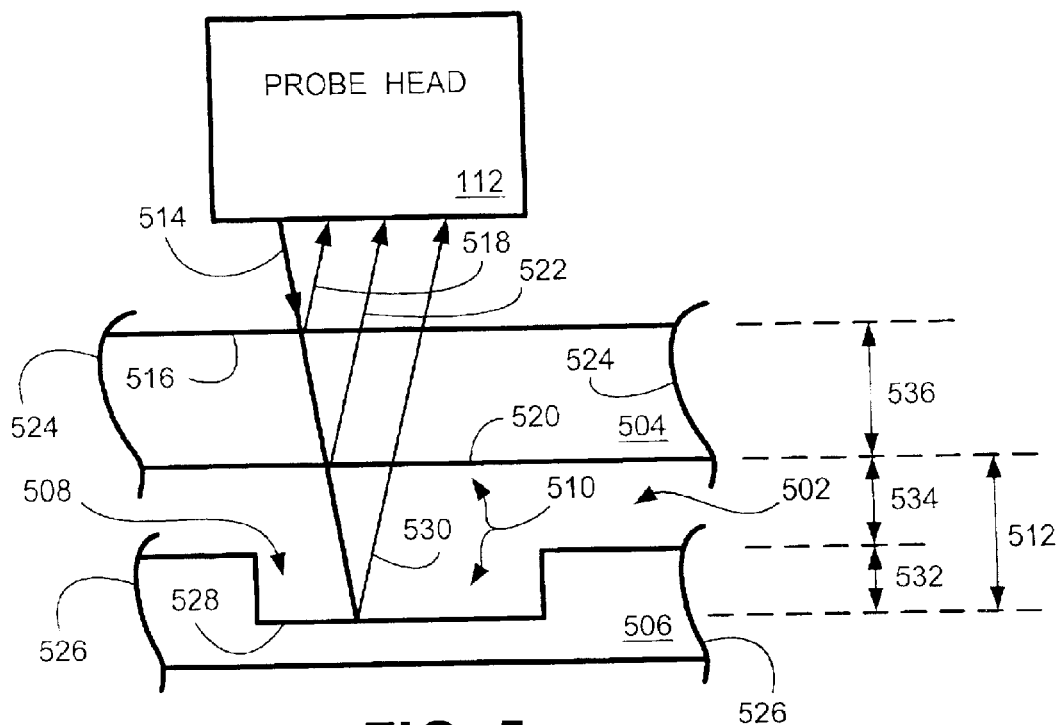
FIG. 5 is a block diagram illustrating the OTG of FIG. 1 measuring a gap between two materials having a slot disposed in the bottom material of FIG. 3.

FIG. 5 is a block diagram illustrating the OTG (not shown) measuring a gap 502 between the two materials 504 and 506 having a slot 508 formed in the material 506. When the slot 508 is positioned underneath the probe head 112 and the material 504, a cavity 510 is formed. The distance 512 associated with cavity 510 is measurable by the OTG (not shown) in which the probe head 112 resides.

Beam 514 is incident upon the top surface 516 of the material 504. A light beam 518 is reflected back up into the probe head 112. Similarly, the unreflected portion of the incident beam 514 travels through the transparent material 504 and is incident upon the bottom surface 520 of the material 504. Thus, a light beam 522 is reflected back up through the material 504 and into the probe head 112.

Material 504 is a transparent material, or a partially transparent material, that allows the incident beam 514 and any reflected beams to travel through the material 504. For convenience of illustration, only a portion of the material 504 is shown, as indicated by the cut-away lines 524. The material 506, positioned below material 504, may be transparent, partially transparent or opaque. For convenience of illustration, only a portion of the material 506 is shown, as indicated by the cut-away lines 526.

With this embodiment, the slot 508 is formed in the material 506. When the incident beam 514 travels through the material 504 and is incident upon the surface 528, a reflected light beam 530 is reflected back up through the material 504 and into the probe head 112.

An autocorrelator (not shown) detects the return light so that correlation peaks are determined and displayed on a graph (not shown). The correlation peaks resulting from measurements of this embodiment are substantially similar to the above-described embodiment wherein the slot 310 was formed in the material 304 (FIG. 3). Thus, the distance 512 associated with the cavity 510 is reliably and accurately measured by the OTG because the distance 512 is greater than the minimum distance that the OTG can reliably and accurately measure. Since the distance 532, associated with the slot 508, is precisely known, the gap distance 534 is determined by simply subtracting the known distance 532 from the measured distance 512. Distance 534 corresponds to the width of the gap 502. Thus, the size of the gap 502 is easily determined.

This alternative embodiment employing a slot 508 formed in the material 506 is particularly advantageous when it is inconvenient to form a slot into the material 504. For example, the material 504 may not be suitable for easily forming a slot, may be too thin to form a slot having a sufficient depth to form a measurable cavity, or may have components residing in the material 504 such that a slot cannot be formed without negatively impacting the functionality of the material 504.

Figure 1:
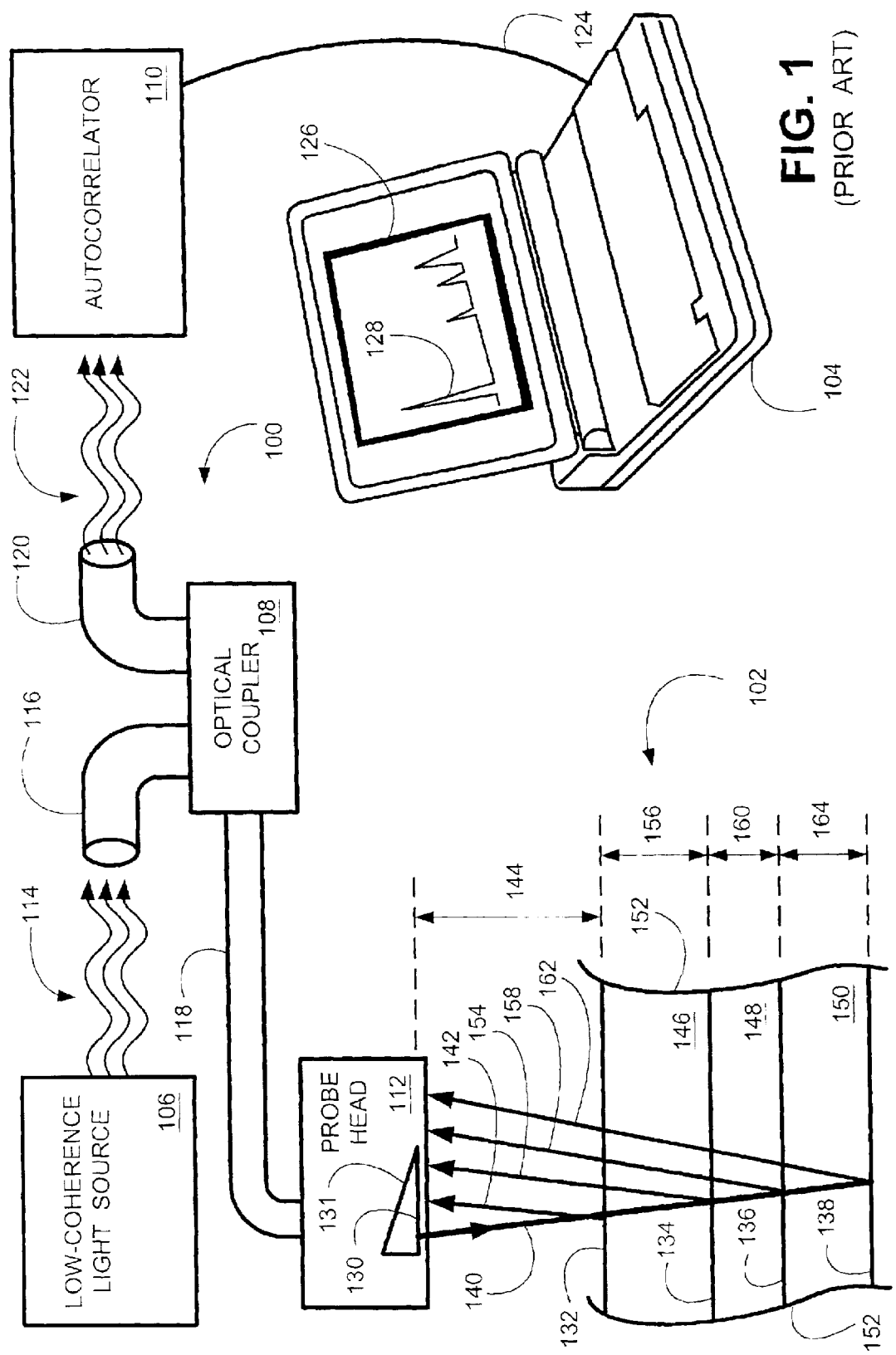
FIG. 1 is a block diagram illustrating a conventional optical thickness gauge (OTG) using a prior art method of measuring distances associated with a film and in communication with a PC.
Figure 2:
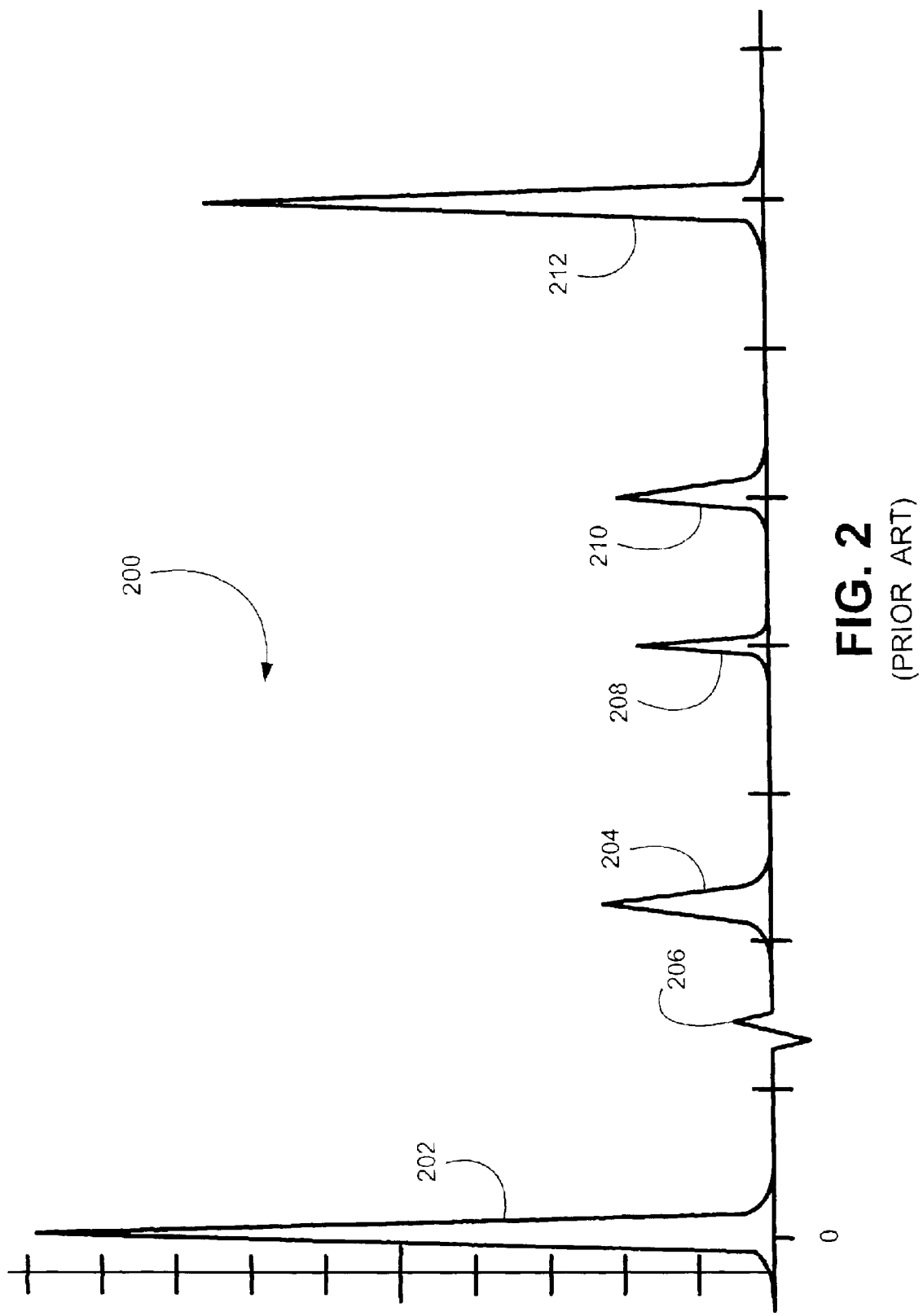
FIG. 2 is a simplified graph illustrating the correlation peaks associated with the reflection of light from the reference surface and the surfaces of the film layers of FIG. 1 using the prior art method of measuring distances.
Figure 6:
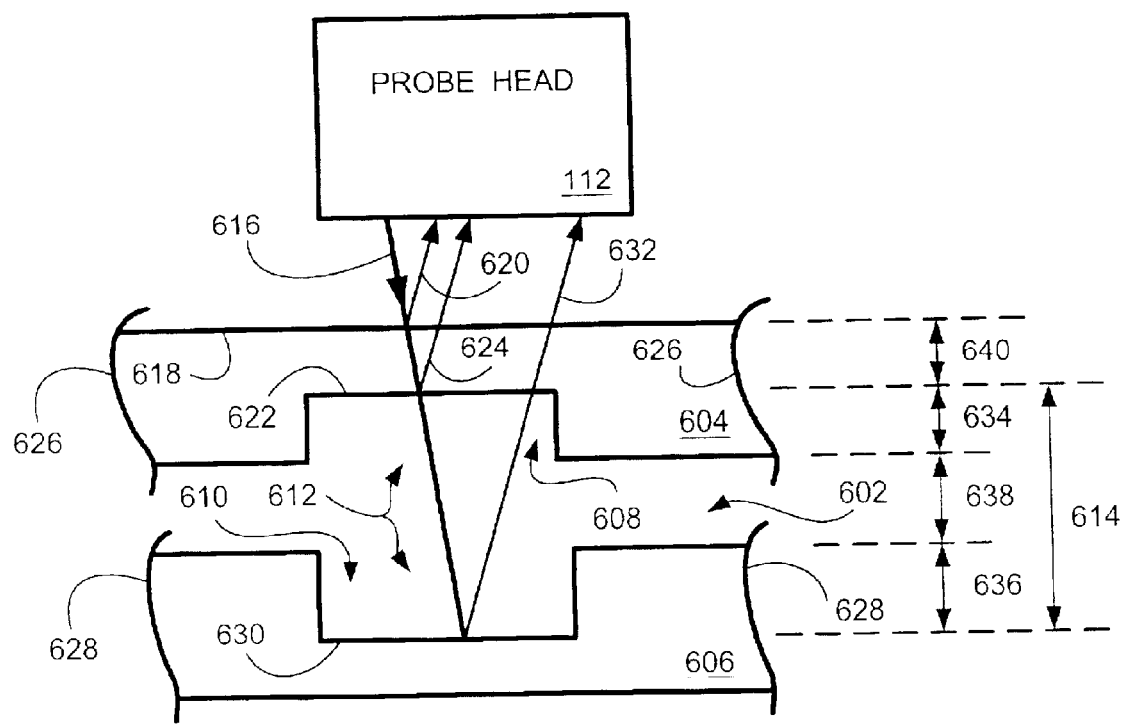
FIG. 6 is a block diagram illustrating the OTG of FIG. 1 measuring a gap between the two materials of FIG. 3, each having a slot disposed in the materials.

FIG. 6 is a block diagram illustrating the OTG of FIG. 1 measuring a gap 602 between the two materials 604 and 606. This embodiment of the invention employs a slot 608 in material 604 and a slot 610 in material 606. When the slots 608 and 610 are positioned underneath the probe head 112, a cavity 612 is formed. The distance 614 associated with the cavity 612 is measurable by the OTG (not shown) in which the probe head 112 resides.

A beam 616 is incident upon the top surface 618 of the material 604. A light beam 620 is reflected back up into the probe head 112. Similarly, the unreflected portion of the incident beam 616 travels through the transparent material 604 and is incident upon the surface 622 of the slot 608 residing in the material 604. A light beam 624 is reflected back up through the material 604 and into the probe head 112.

Material 604 is a transparent material, or a partially transparent material, that allows a portion of the incident beam 616 and any reflected beams to travel through the material 604. For convenience of illustration, only a portion of the material 604 is shown, as indicated by the cut-away lines 626. Material 606 may be transparent, partially transparent or opaque. For convenience of illustration, only a portion of the material 606 is shown, as indicated by the cut-away lines 628.

With this embodiment, the slot 608 is formed in the material 604 and the slot 610 is formed in the material 606. When the incident beam 616 travels through the material 604 and is incident upon the surface 630 formed by the slot 610, a light beam 632 is reflected back up through the material 604 and into probe head 112.

An autocorrelator (not shown) detects the return light such that correlation peaks are determined and displayed on a graph (not shown). The correlation peaks resulting from measurements of this embodiment are substantially similar to the above-described embodiment wherein a single slot 310 was formed in the material 304 (FIG. 3). Thus, the distance 614 associated with the cavity 612 is reliably and accurately measured by the OTG because the distance 614 is greater than the minimum distance that the OTG can reliably and accurately measure. The distance 634, associated with the slot 608, is precisely known. Similarly, the distance 636, associated with the slot 610, is precisely known. Therefore, the gap distance 638 is determined by simply subtracting the known distances 634 and 636 from the measured distance 614. The distance 638 corresponds to the width of the gap 602. Thus, the size of the gap 602 is easily determined.

The alternative embodiment of the invention above employing a slot 608 formed in the material 604, and a slot 610 formed in the material 606, is particularly advantageous when it is inconvenient to form a slot into either materials 604 or 606 alone. For example, the material 604 may not be suitable for easily forming a single large slot, may be too thin to form a single large slot having a sufficient depth to form a measurable cavity, or may have components residing in the material 604 such that a single large slot cannot be formed without negatively impacting the functionality of the material 604. Similarly, the material 606 may not be suitable for easily forming a single large slot, may be too thin to form a single large slot having a sufficient depth to form a measurable cavity, or may have components residing in the material 606 such that a single large slot cannot be formed without negatively impacting the functionality of the material 606. Thus, forming a shallower slot in each of the materials 604 and 606 creates a cavity 612 that can be reliably and accurately measured by the OTG.

Figure 7:
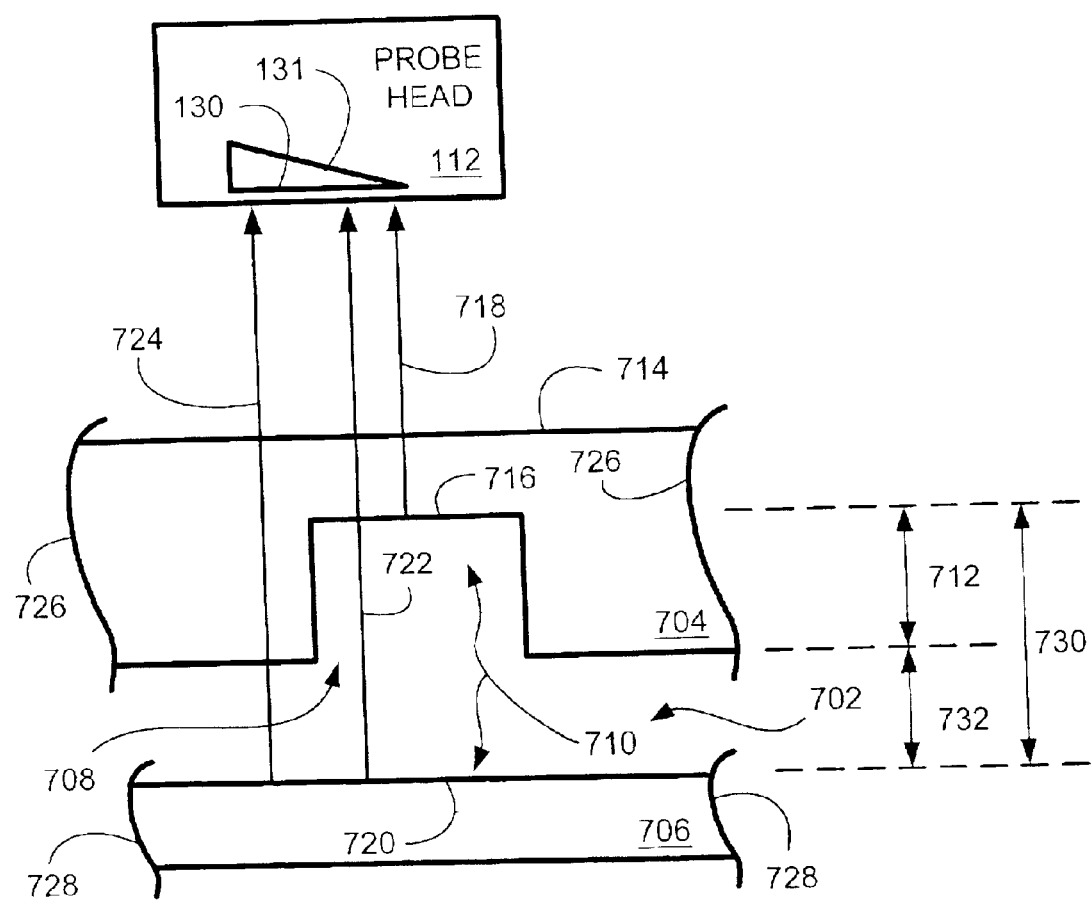
FIG. 7 is a block diagram illustrating the OTG of FIG. 1 measuring a gap between the two materials of FIG. 3.

FIG. 7 is a block diagram illustrating the OTG 100 (FIG. 1) measuring a gap 702 between the two materials 704 and 706. Material 704 has a slot 708. When the slot 708 is positioned underneath the probe head 112, a cavity 710 is formed. The distance 712 associated with the slot 708 is measurable by the OTG (not shown) in which the probe head 112 resides. That is, material 704 is sufficiently thick to form a slot 708 having a depth (corresponding to distance 712) that is at least equal to the smallest distance that the OTG can reliably and accurately measure. For example, if the smallest distance that the OTG can measure is 10 $\mu$m, the distance 712 is at least 10 $\mu$m. Preferably, the distance 712 is greater than 10 $\mu$m.

When an incident beam (not shown) is incident upon the top surface 714 of the material 704, the unreflected portion of the incident beam travels through the transparent material 704 and is incident upon the surface 716. Thus, a light beam 718 is reflected back up through the material 704 and into the probe head 112. A portion of the incident beam continues to travel through the transparent material 704 and the cavity 710, and is incident upon the surface 720 such that a light beam 722 is reflected back up through the cavity 710 and the material 704, and into the probe head 112. Furthermore, another portion of the incident beam travels through the full thickness of the material 704 (not through the slot 708) and through the gap 702, and is incident upon the surface 720. A light beam 724 is reflected back up through the gap 702 and the full thickness of the material 704, and into probe head 112. Material 704 is a transparent material, or a partially transparent material, that allows the incident beam and any reflected beams to travel through the material 704.

For convenience of illustration, only a portion of the material 704 is shown, as indicated by the cut-away lines 726. Material 706 may be transparent, partially transparent or opaque. For convenience of illustration, only a portion of the material 706 is shown, as indicated by the cut-away lines 728.

An autocorrelator (not shown) detects the return light (reflected beams 718, 722 and 724). Thus, correlation peaks are determined and displayed on a graph (not shown). The correlation peaks resulting from measurements of this embodiment are substantially similar to the above-described embodiment wherein a single slot 310 was formed in the material 304 (FIG. 3). However, correlation peaks associated with beam 724 will be displayed on the graph that will be used to determine the measured distances. Furthermore, the distance 712 associated with the slot 708 is reliably and accurately measured by the OTG because the distance 712 is greater than the minimum distance that the OTG can reliably and accurately measure.

The distance 730 associated with the slot 708 and the gap 702 is reliably and accurately measured by the OTG because the distance 730 is greater than the minimum distance that the OTG can reliably and accurately measure. The distance 732 is determined by simply subtracting the calculated distance 712 (of the slot 708) from the measured distance 730 (of the cavity 710). The distance 732 corresponds to the width of the gap 702. Thus, the width of the gap 702 is easily determined.

Furthermore, the distance 732 may be determined if the refractive index n of material 704 is known. The distance traveled by the reflected beams 722 and 724 are equal, assuming that the surface 720 is flat and that the reference surface 130 is aligned parallel to the surface 720. A time delay is induced in the reflected beam 724, with respect to the reflected beam 722, because of the refractive index n of material 704. That is, since the reflected beam 722 (and the incident beam) travels the distance 712 through air, and the reflected beam 724 (and the incident beam) travels the distance 712 through the material 704, the reflected beam 724 is delayed compared to the reflected beam 722, by a factor that corresponds to the refractive index n of material 704. Knowing the index of refraction n, the distance 712 of the slot depth can be easily calculated from the distances measured on the OTG between the peaks from reflected beams 722 and 724. The distance 732 is determined by subtracting distance 712 from measured distance 730. Thus, the distance 732 is easily determined by measuring the separation of the correlation peaks associated with the reflected beams 718, 722 and 724, and by relating the measured separation of the correlation peaks with the refractive index n.

The alternative embodiment above employing a slot 708 formed in the material 704 is particularly advantageous when it is inconvenient to precisely measure the distance 712 of the slot 708, or if the slot 708 having a precisely known distance 712 is difficult or impossible to form in the measured materials. The user measuring the gap 702 need only shine the incident beam onto the material 704 and 706 so that the reflected beams 718, 722 and 724 are detected by the OTG. That is, a slot having any depth (at least equal to the minimum distance that the OTG can reliably and accurately measure) is formed in the material 704 in a convenient manner, and all necessary distance measurements are taken to reliably and accurately determine the distance 732 associated with the gap 702.

Alternatively, in the event that material 704 is not sufficiently thick enough for the above described gap 708, a similar gap (having a depth at least equal to the minimum distance that the OTG can reliably and accurately measure) may be formed in the material 706. Thus, measurements are taken with the OTG to reliably and accurately determine the distance 732 associated with the gap 702.

For convenience of describing the functionality and operation of the OTG 100 (FIG. 1), the OTG 100 was described as employing low-coherence light generated by the low-coherence light source 106. Alternative embodiments of the present invention employ other transmittable, low-coherence energy spectrums. Waves associated with the selected spectrum are shined upon the surfaces of materials having slots or the like as described above. The reflected waves are then correlated to accurately and reliably measure a gap between two materials. For example, a wave residing in the infra red portion of the energy spectrum could be selected.

Another embodiment of the present invention employs slots disposed in the materials in accordance with the above described embodiments. However, measurements of the distances are taken with a split-beam OTG constructed in accordance the copending and commonly assigned U.S. patent application Ser. No. 09/929,767, filed on Aug. 14, 2001, and entitled OPTICAL MEASUREMENT SYSTEM AND METHOD FOR DETERMINING HEIGHT DIFFERENTIAL BETWEEN TWO SURFACES, which is entirely incorporated herein by reference.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

Now, therefore, the following is claimed:

1. A system for measuring a distance between materials using a light source, the system comprising:
 a first optical material having a first surface and an opposing second surface;
 a second material having a third surface and an opposing fourth surface, the third surface of the second material being separated from the second surface of the first material by a gap; and
 a distance-measurement-offset slot disposed in the first optical material and extending into the first optical material from the second surface of the first optical material, the slot defined in part by a slot surface, such that light transmitted by the light source generates a first reflection from the first surface, a second reflection from the slot surface, a third reflection from the third surface, and wherein the reflections provide distance information between the three surfaces.

2. The system of claim 1 wherein the second material is a second optical material.

3. The system of claim 2, further comprising a second distance-measurement-offset slot disposed in the second optical material and extending into the second optical material from the third surface of the second optical material, the second distance-measurement-offset slot defined in part by a second slot surface, such that light transmitted by the light source generates a fourth reflection from the second slot surface.

4. A method for measuring distance between two optical materials, the method comprising:

using a distance-measurement-offset slot disposed in at least one of the two optical materials, the slot in part defined by a partially reflecting surface that produces a reflection to determine the distance between the first material and the second material.

5. The method of claim 4, further comprising the step of measuring a depth of the distance-measurement-offset slot.

6. The method of claim 5, further comprising the step of measuring a distance between the slot surface and a surface of the second material.

7. The method of claim 4, comprising the steps of:

transmitting a light through the first material and the distance-measurement-offset slot, and onto a surface of the second material; and detecting a first reflected light from the slot surface of the distance-measurement-offset slot and a second reflected light from the surface of the second material such that the measured distance is determined.

8. The method of claim 4, further comprising:

using a second distance-measurement-offset slot disposed in the other of the at least one of two optical materials.

9. The method of claim 4, wherein the step of using the distance-measurement-offset slot comprises:

measuring a depth of the distance-measurement-offset slot;

providing an incident light upon a first surface of the at least one of two optical materials;

transmitting the light through the at least one of two optical materials and the distance-measurement-offset slot, wherein the light is then incident on a second surface of the other of the at least one of two optical materials;

receiving a first reflected light from the slot surface;

calculating a first distance using the first reflected light;

receiving a second reflected light from the second surface;

calculating a second distance using the second reflected light;

calculating the distance between the first and second materials using the first distance, the second distance, and the depth of the distance-measurement-offset slot.

10. The method of claim 9, wherein calculating the distance between the first and second materials comprises a subtraction of the depth measurement of the distance-measurement-offset slot from the second distance.

11. The method of claim 9 further comprising:

using the calculated distance to reiteratively re-position one of the two materials to obtain a desired distance between the two materials.

12. An optical measurement system comprising a distance-measurement-offset recess disposed in a first optical material, the distance-measurement-offset recess located in an optical measurement transmission path to provide a distance information between at least two reflecting surfaces, the distance information including a distance offset corresponding to a depth of the recess.

13. The optical measurement system of claim 12, further comprising:

a multi-layer material comprising the first optical material, wherein the first optical material has a first surface and an opposing second surface, the recess is disposed from the second surface of the first optical material towards the first surface of the first optical material, the recess having a depth dimension less than the thickness of the first optical material, the recess having a partially reflective surface; and a second material having a third surface substantially parallel to the second surface of the first optical material.

14. The system of claim 13 wherein the second material is a second optical material.

15. The system of claim 14 further comprising a second recess disposed in the second optical material, the second recess disposed from the third surface of the second optical material towards an opposing fourth surface of the second optical material, the second recess having a depth dimension less than the thickness of the second optical material, and the second recess having a second partially reflective surface.

16. The system of claim 15 wherein the fourth surface of the second optical material is reflective.

17. The system of claim 15 wherein the fourth surface of the second optical material is partially reflective.

* * * * *